(12) United States Patent
Chiurato et al.

(10) Patent No.: US 8,043,061 B2
(45) Date of Patent: Oct. 25, 2011

(54) TURBINE BUCKET TIP SHROUD EDGE PROFILE

(75) Inventors: Tony Chiurato, Simpsonville, SC (US); Sze Bun Brian Chan, Roswell, GA (US); Bogdan Razvan Raica, Mauldin, SC (US); Samar Barua, Karnataka (IN); Jacob Charles Perry, II, Taylors, SC (US)

(73) Assignee: General Electric Company, Schenectady, NY (US)

( * ) Notice: Subject to any disclaimer, the term of this patent is extended or adjusted under 35 U.S.C. 154(b) by 1360 days.

(21) Appl. No.: 11/892,355

(22) Filed: Aug. 22, 2007

(65) Prior Publication Data
US 2009/0053047 A1 Feb. 26, 2009

(51) Int. Cl.
*F01D 5/22* (2006.01)
(52) U.S. Cl. .................................................. 416/189
(58) Field of Classification Search ............... 415/170.1, 415/173.1, 173.6; 416/189, 190, 191, 195
See application file for complete search history.

(56) References Cited

U.S. PATENT DOCUMENTS 6,851,931 B1 * 2/2005 Tomberg ..................... 416/189
6,893,216 B2 * 5/2005 Snook et al. ............... 415/173.1

OTHER PUBLICATIONS

U.S. Application of Delong et al. U.S. Appl. No. 11/882,373, filed Aug. 1, 2007.
U.S. Application of Arness et al. U.S. Appl. No. 11/882,531, filed Aug. 2, 2007.

* cited by examiner

*Primary Examiner* — Edward Look
*Assistant Examiner* — Aaron R Eastman
(74) *Attorney, Agent, or Firm* — Nixon & Vanderhye PC

(57) ABSTRACT

A turbine bucket includes a bucket airfoil having a tip shroud with a leading edge comprising two scalloped faces and a trailing edge comprising a third scalloped face defining leading and trailing edge profiles substantially in accordance with Cartesian coordinate values of X and Y as points 1-41 set forth in Table I. The X and Y values are distances in inches which, when respective points are connected by smooth, continuing arcs define the leading and trailing edge tip shroud scalloped profiles. The tip shroud further has first and second, upper and lower, Z form edge profiles substantially in accordance with Cartesian coordinate values of X and Y as points 42-59 and 60-77, respectively of Table II.

20 Claims, 5 Drawing Sheets

TURBINE BUCKET TIP SHROUD EDGE PROFILE

BACKGROUND OF THE INVENTION

The present invention relates to turbine buckets having an airfoil and a tip shroud carried by the airfoil. More particularly, the invention relates to leading, trailing and Z-form edge profiles of a tip shroud carried by an airfoil of a turbine bucket.

Buckets for turbines typically comprise an airfoil, a platform, a shank and dovetail. The dovetail is secured in a complementary slot in a turbine wheel. Oftentimes, the airfoil includes an integrally formed tip shroud. The bucket including the airfoil and tip shroud are, of course, rotatable about the engine centerline during operation and the airfoil and the tip shroud are located in the hot gas path. Because the tip shroud is mounted at the tip of the airfoil, substantial stresses occur in the tip shroud fillet region between the tip shroud and the airfoil tip. Particularly, a significant difference in fillet stresses occurs between pressure and suction sides of the airfoil at its intersection with the tip shroud because of tip shroud mass imbalance relative to the airfoil. This mass imbalance negatively impacts the creep life of the bucket. That is, the tip shroud mass distribution in prior buckets resulted in a highly loaded tip shroud fillet and reduced creep life. Further, certain prior tip shrouds do not cover the airfoil throat, with resultant negative impact on stage efficiency due to flow leakage over the tip shroud.

BRIEF DESCRIPTION OF THE INVENTION

In accordance with an example embodiment of the present invention, there is provided a turbine bucket including a bucket airfoil having a tip shroud, the tip shroud having leading and trailing edge profiles for optimizing tip shroud mass distribution to balance tip shroud fillet stresses, thereby maximizing creep life and also ensuring coverage of the airfoil throat to improve stage efficiency. Particularly, the leading edge of the tip shroud, i.e., the edge generally facing axially upstream in the hot gas path of the turbine, has a predetermined profile including first and second scalloped sections substantially in accordance with X and Y coordinate values in a Cartesian coordinate system at points 1-6 and 7-21, respectively set forth in Table I, where X and Y are distances in inches from an origin and, when points 1-6 and points 7-21 are respectively connected by smooth, continuing arcs, the points define the first and second scalloped sections of the leading edge tip shroud profile.

The invention may also be embodied in a turbine bucket including a bucket airfoil having a tip shroud, said tip shroud having leading and trailing edges, said trailing edge having a predetermined profile including a scalloped section substantially in accordance with X and Y coordinate values in a Cartesian coordinate system at points 22-41 set forth in Table I, where X and Y are distances in inches from an origin and, when points 22-41 are connected by smooth, continuing arcs, the points define the scalloped section of the trailing edge tip shroud profile.

In a further example embodiment of the invention, a turbine bucket is provided that includes a bucket airfoil having a tip shroud, said tip shroud having leading and trailing edges and first and second Z form edge profiles, said first and second Z form edge profiles having a predetermined profile substantially in accordance with X and Y coordinate values in a Cartesian coordinate system at points 42-59 and 60-77, respectively set forth in Table II, where X and Y are distances in inches from an origin and, when points 42-59 and points 60-77 are respectively connected by smooth, continuing arcs or lines, the points define the first and second Z form edge profiles.

BRIEF DESCRIPTION OF THE DRAWINGS

These and other objects and advantages of this invention, will be more completely understood and appreciated by careful study of the following more detailed description of the presently preferred example embodiments of the invention taken in conjunction with the accompanying drawings, in which.

DETAILED DESCRIPTION OF THE INVENTION

Figure 1:
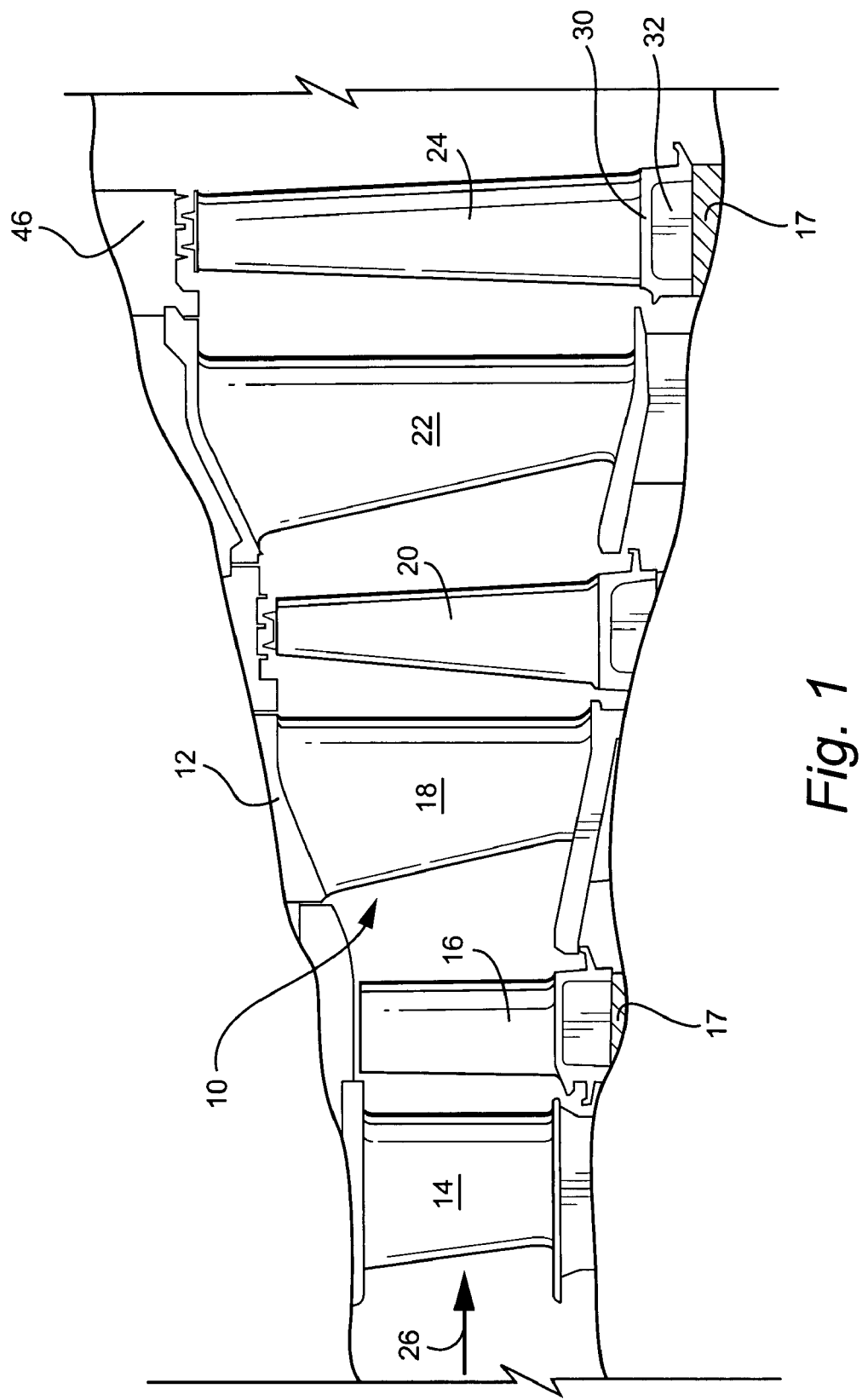
FIG. 1 is a schematic illustration of a turbine section having a third stage turbine bucket tip shroud with predetermined leading and trailing edge profiles according to a preferred embodiment of the present invention.

Referring now to the drawing figures, particularly to FIG. 1, there is illustrated a hot gas path, generally designated 10, of a gas turbine 12 including a plurality of turbine stages. Three stages are illustrated. For example, the first stage comprises a plurality of circumferentially spaced nozzles 14 and buckets 16. The nozzles are circumferentially spaced one from the other and fixed about the axis of the rotor. The first stage buckets 16, of course, are mounted on the turbine rotor wheel 17. A second stage of the turbine 12 is also illustrated, including a plurality of circumferentially spaced nozzles 18 and a plurality of circumferentially spaced buckets 20 mounted on the rotor. The third stage is also illustrated including a plurality of circumferentially spaced nozzles 22 and buckets 24 mounted on the rotor 17. It will be appreciated that the nozzles and buckets lie in the hot gas path 10 of the turbine 12, the direction of f low of the hot gas through the hot gas path 10 being indicated by the arrow 26.

Each bucket 24 of the third stage is provided with a platform 30, a shank 32 and a dovetail, not shown, for connection with a complementary-shaped mating dovetail, also not shown, on a rotor wheel forming part of the rotor. Each of the third stage buckets 24 also includes an airfoil 34 (FIG. 2) having an airfoil profile at any cross-section along the airfoil from the platform to the airfoil tip, as illustrated by the dashed lines in FIGS. 2-5.

Figure 2:
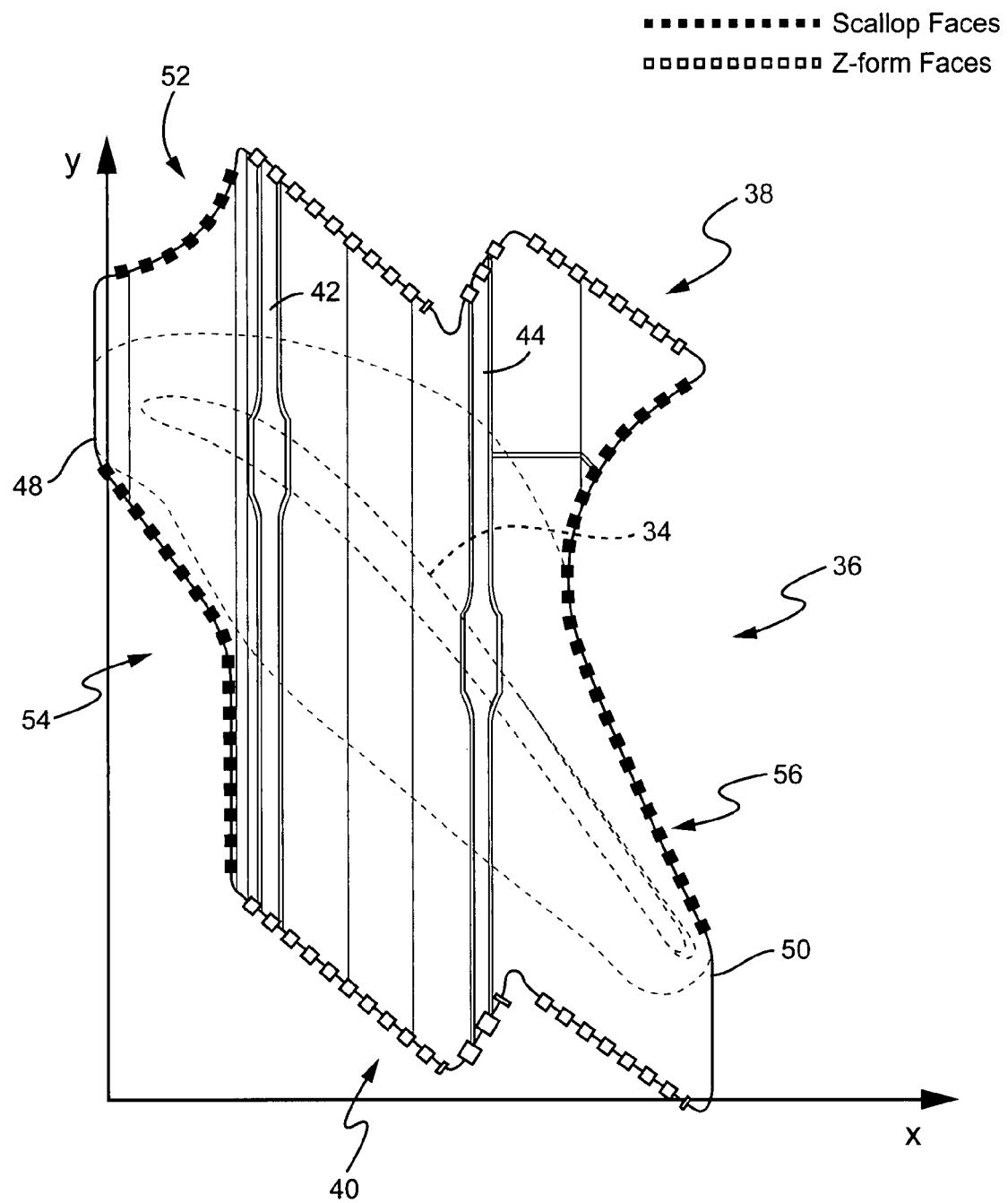
FIG. 2 is an enlarged end view of a tip shroud embodying the invention as viewed looking radially inwardly and illustrating the coordinate system used to determine the coordinates for the points set forth in Tables I and II.
Figure 3:
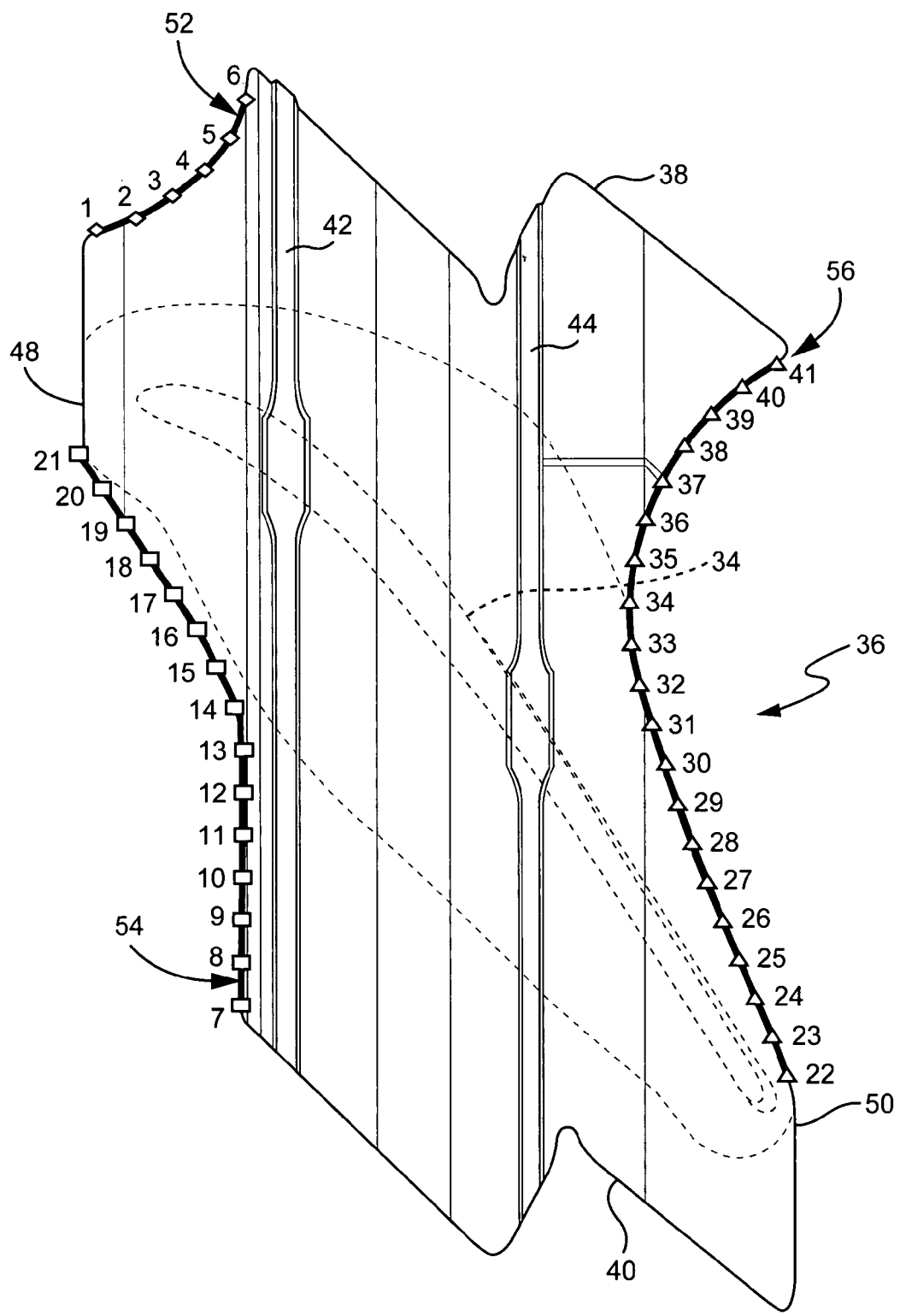
FIG. 3 is an enlarged end view of a tip shroud embodying the invention as viewed looking radially inwardly and illustrating the location of the points set forth in Table I.
Figure 4:
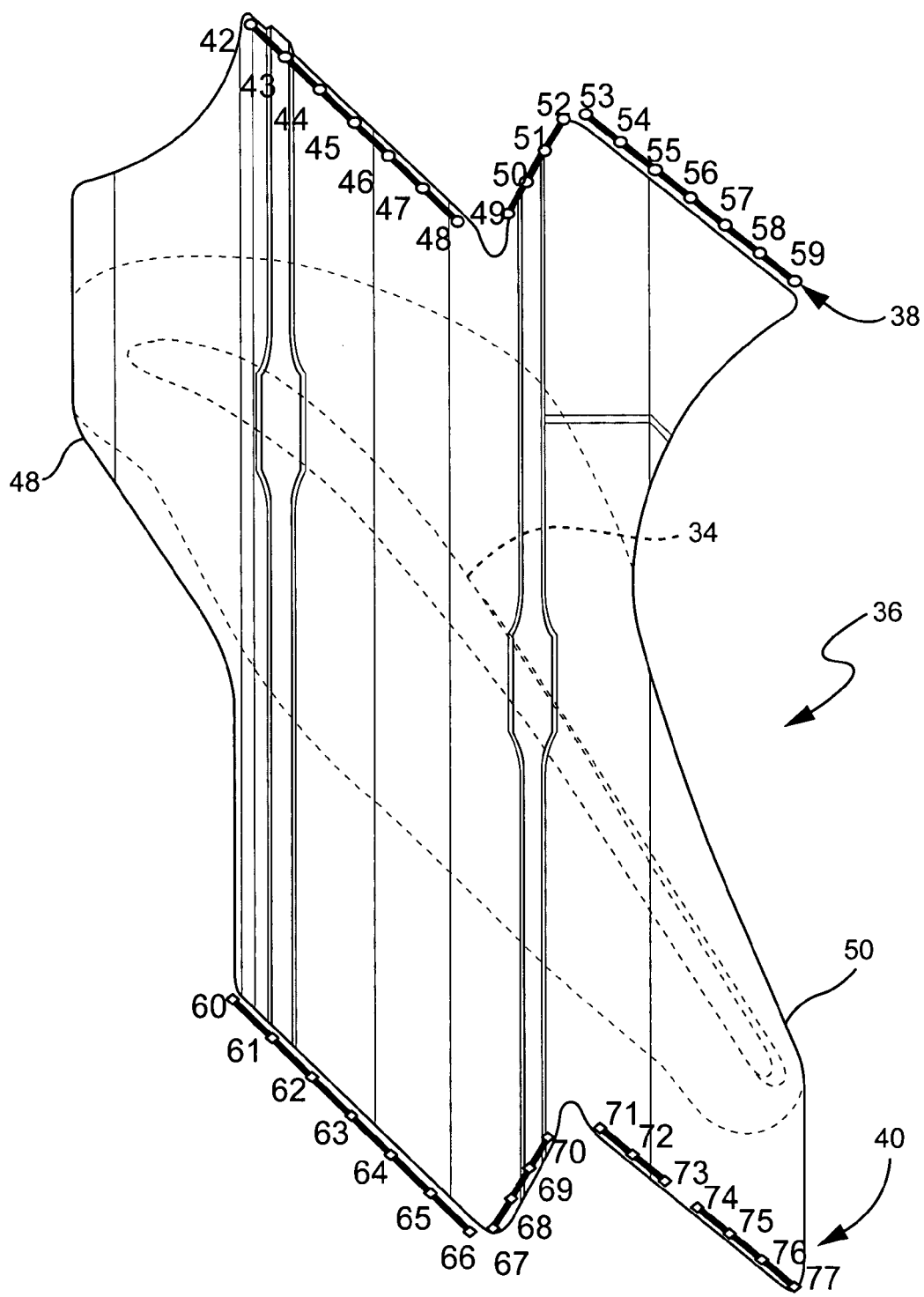
FIG. 4 is an enlarged end view of a tip shroud embodying the invention as viewed looking radially inwardly and illustrating the location of the points set forth in Table II.

A tip shroud embodying the invention is provided for an F-class turbine stage 3 bucket. Referring to FIGS. 2-5, each of the third stage buckets is provided with a tip shroud generally designated 36. The tip shrouds 36 are preferably formed integrally with the buckets and each tip shroud engages at circumferentially opposite ends 38,40 adjacent tip shrouds of adjacent buckets to form a generally annular ring or shroud circumscribing the hot gas path at the axial location of the second stage buckets. As illustrated in FIGS. 2-5, the tip shroud 36 of each third stage bucket 24 includes first and second, leading and trailing, seal rails 42,44 along its radial outer surface and which seal rails 42,44 form continuous seal rings about the tip shroud for sealing with the shroud 46 (FIG. 1) fixed to the turbine casing. As illustrated in FIG. 2, it will be appreciated that the tip shroud 36 includes shaped leading and trailing edges 48 and 50, respectively. The shaped leading edge includes first and second scalloped portions 52,54 whereas the trailing edge includes a single scalloped portion 56. The leading and trailing edges lie on opposite axial facing sides of the tip shroud 36 in the hot gas path.

To define the shape of the leading and trailing edge scallops 52,54,56, respectively, a unique set or loci of points in space are provided, particularly, in a Cartesian coordinate system of X and Y axes as schematically depicted in FIG. 2. X and Y values of representative points as labeled in FIG. 3 for the respective scalloped faces 52,54,56 are given in Table I below and define the profile of the leading and trailing edges at various locations therealong. The values for the X and Y coordinates are set forth in inches in Table I, although other units of dimensions may be used when the values are appropriately converted. By defining X and Y coordinate values at selected locations relative to the origin of the X and Y axes, the locations of the points numbered 1 through 41 can be ascertained. By connecting the X and Y values with smooth, continuing arcs along each of the scalloped faces as so defined, each edge profile can be ascertained.

It will be appreciated that these values represent the leading and trailing scalloped edge profiles at ambient, non-operating or non-hot conditions, i.e., cold conditions.

TABLE I

|  | x | y |
|---|---|---|
| Face 1 | | |
| 1 | 0.0083 | 0.8950 |
| 2 | 0.0423 | 0.9040 |
| 3 | 0.0742 | 0.9188 |
| 4 | 0.1025 | 0.9397 |
| 5 | 0.1252 | 0.9664 |
| 6 | 0.1395 | 0.9985 |
| Face 2 | | |
| 7 | 0.1258 | 0.2324 |
| 8 | 0.1263 | 0.2684 |
| 9 | 0.1268 | 0.3044 |
| 10 | 0.1274 | 0.3403 |
| 11 | 0.1279 | 0.3763 |
| 12 | 0.1284 | 0.4123 |
| 13 | 0.1291 | 0.4483 |
| 14 | 0.1275 | 0.4842 |
| 15 | 0.1184 | 0.5189 |
| 16 | 0.1021 | 0.5509 |
| 17 | 0.0818 | 0.5806 |
| 18 | 0.0613 | 0.6101 |
| 19 | 0.0408 | 0.6397 |
| 20 | 0.0204 | 0.6693 |
| 21 | 0.0000 | 0.6990 |
| Face 3 | | |
| 22 | 0.6085 | 0.1753 |
| 23 | 0.5960 | 0.2081 |
| 24 | 0.5813 | 0.2403 |
| 25 | 0.5670 | 0.2726 |
| 26 | 0.5531 | 0.3052 |
| 27 | 0.5399 | 0.3381 |
| 28 | 0.5271 | 0.3711 |
| 29 | 0.5145 | 0.4042 |
| 30 | 0.5018 | 0.4372 |
| 31 | 0.4897 | 0.4705 |
| 32 | 0.4792 | 0.5043 |

TABLE I-continued

|  | x | y |
|---|---|---|
| 33 | 0.4721 | 0.5390 |
| 34 | 0.4705 | 0.5743 |
| 35 | 0.4751 | 0.6094 |
| 36 | 0.4848 | 0.6434 |
| 37 | 0.4992 | 0.6757 |
| 38 | 0.5181 | 0.7056 |
| 39 | 0.5414 | 0.7322 |
| 40 | 0.5684 | 0.7550 |
| 41 | 0.5982 | 0.7742 |

To define the shape of the Z-forms defining the first and second, upper and lower according to the illustrated configuration, circumferentially opposite ends of the tip shroud 38,40, respectively, a unique set or loci of points in space are provided, particularly, in a Cartesian coordinate system of X and Y axes as schematically depicted in FIG. 2. X and Y values of representative points as labeled in FIG. 4 for the respective Z-forms are given in Table II below and define the profile of the circumferentially opposite ends of the tip shroud at various locations therealong. The values for the X and Y coordinates are set forth in inches in Table II, although other units of dimensions may be used when the values are appropriately converted. By defining X and Y coordinate values at selected locations relative to the origin of the X and Y axes, the locations of the points numbered 42 through 77 can be ascertained. By connecting the X and Y values with smooth, continuing lines or arcs along each of the Z-forms as so defined, each circumferential end edge profile can be ascertained.

It will be appreciated that these values represent the circumferential end Z-form profiles at ambient, non-operating or non-hot conditions, i.e., cold conditions.

TABLE II

|  | x | y |
|---|---|---|
| Upper | | |
| 42 | 0.1448 | 1.0000 |
| 43 | 0.1735 | 0.9738 |
| 44 | 0.2023 | 0.9477 |
| 45 | 0.2310 | 0.9215 |
| 46 | 0.2598 | 0.8954 |
| 47 | 0.2885 | 0.8692 |
| 48 | 0.3173 | 0.8431 |
| 49 | 0.3595 | 0.8492 |
| 50 | 0.3752 | 0.8741 |
| 51 | 0.3909 | 0.8991 |
| 52 | 0.4066 | 0.9240 |
| 53 | 0.4252 | 0.9275 |
| 54 | 0.4543 | 0.9055 |
| 55 | 0.4834 | 0.8835 |
| 56 | 0.5125 | 0.8615 |
| 57 | 0.5416 | 0.8395 |
| 58 | 0.5707 | 0.8175 |
| 59 | 0.5998 | 0.7954 |
| Lower | | |
| 60 | 0.1278 | 0.2277 |
| 61 | 0.1609 | 0.1970 |
| 62 | 0.1940 | 0.1663 |
| 63 | 0.2271 | 0.1356 |
| 64 | 0.2602 | 0.1049 |
| 65 | 0.2933 | 0.0742 |
| 66 | 0.3265 | 0.0435 |
| 67 | 0.3459 | 0.0460 |
| 68 | 0.3612 | 0.0701 |
| 69 | 0.3765 | 0.0941 |
| 70 | 0.3918 | 0.1182 |
| 71 | 0.4359 | 0.1259 |

TABLE II-continued

| | x | y |
|---|---|---|
| 72 | 0.4629 | 0.1049 |
| 73 | 0.4899 | 0.0839 |
| 74 | 0.5169 | 0.0629 |
| 75 | 0.5439 | 0.0420 |
| 76 | 0.5710 | 0.0210 |
| 77 | 0.5980 | 0.0000 |

It will be appreciated that there are typical manufacturing tolerances, as well as coatings, which must be accounted for in the actual profiles of the tip shroud edge faces. Accordingly, the values for the tip shroud profile given in Tables I and II are for a nominal tip shroud. It will therefore be appreciated that +/− typical manufacturing tolerances, i.e., +/− values, including any coating thicknesses, are additive to the X, Y values given in TABLES I and II above. Accordingly, a distance of +/−0.080 inches in a direction normal to any surface location along the leading and trailing edges and Z-forms defines a tip shroud edge profile envelope along the respective leading and trailing edges and Z-forms for this particular tip shroud design, i.e., a range of variation between measured points on the actual edge profiles at a nominal cold or room temperature and the ideal position of those edge profiles as given in the Tables I and II above at the same temperature. The tip shroud design is robust to this range of variation without impairment of mechanical and aerodynamic function and is embraced by the profiles substantially in accordance with the Cartesian coordinate values of the points 1-77 set forth in Tables I and II.

The CV7241 hot gas path requires a third stage tip shroud to meet aerodynamics efficiency requirements. The tip shroud design defined herein is unique and is specific to the system but is scaleable to other frame sizes. Thus, it will also be appreciated that the tip shroud disclosed in Tables I and II above may be scaled up or down geometrically for use in other similar turbine designs. Consequently, the coordinate values set forth in Tables I and II may be scaled upwardly or downwardly such that the tip shroud leading and trailing edge scalloped profiles and the upper and lower Z form profiles remain unchanged. A scaled version of the coordinates of Tables I and II would be represented by X and Y coordinate values of Tables I and II multiplied or divided by the same number.

According to further features of the invention, the tip shroud shape is further characterized by seal rail placement for optimizing aerodynamics benefits and mechanical requirements. More specifically, referring to FIG. 5, in an example embodiment, the double rails 44,42 are located at prescribed distances a and b, respectively, from the trailing edge of the airfoil 34, depicted in phantom in FIG. 5. In the illustrated example embodiment, the distance a from the trailing edge of the airfoil 34 to the trailing seal rail 44 is 0.81+/−0.13 inches and distance b to the leading seal rail 42 is 1.81+/−0.13 inches.

The illustrated seal rails further include cutter teeth 62,60 that are respectively located at prescribed distances y1 and y2 from the trailing edge of the airfoil 34. In the illustrated example embodiment, distance y1 to the midpoint of the cutter tooth 62 of the trailing seal rail 44 is 1.44+/−0.13 inches and distance y2 from the trailing edge to the midpoint of the cutter tooth 60 of the leading seal rail 42 is 2.43+/−0.13 inches.

Figure 5:
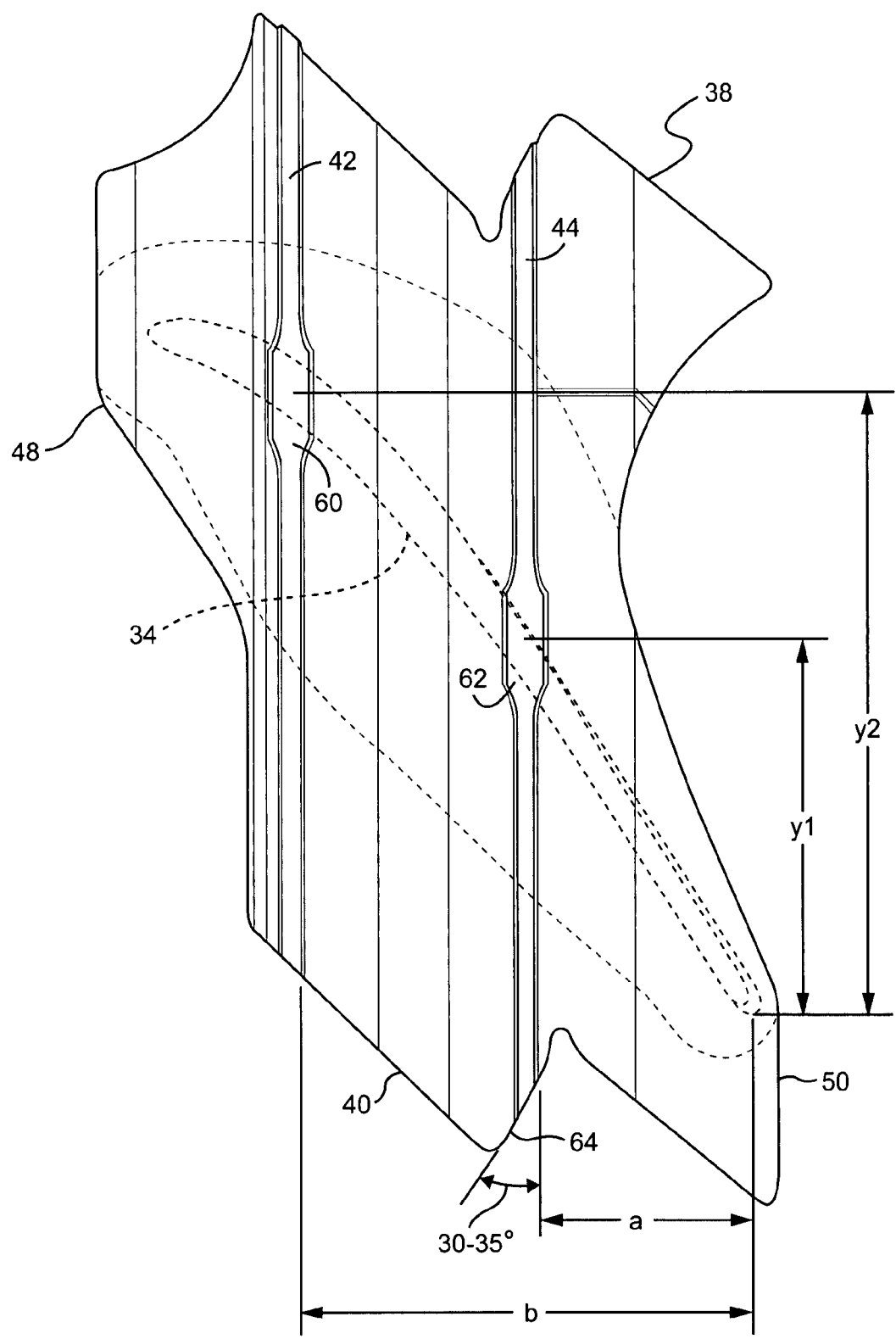
FIG. 5 is a view similar to FIG. 2, wherein the coordinate system has been omitted and dimensional relations among parts of the tip shroud are illustrated in an example embodiment of the invention.

As also illustrated, yet a further characteristic feature of the illustrated example embodiment is that the trailing seal rail 44 and hard face region 64 are co-located for mechanical benefits. In an example embodiment, as also illustrated in FIG. 5, that hard face 64 is at an angle of about 30 to 35 degrees with respect to the longitudinal axis of the trailing seal rail 44.

As illustrated in FIGS. 1-5, yet a further characterizing feature of the illustrated tip shroud is that there is uneven tip shroud coverage on a pressure and suction side of the airfoil on the leading edge 48 of the tip shroud 36 and single-sided coverage on the trailing edge 50 of the tip shroud 36 for aerodynamic benefits.

The unique tip shroud shape and rail placement defined hereinabove are for optimizing aerodynamics benefits and mechanical requirements.

The unique tip shroud design of the invention has been provided to meet CV7241's aerodynamics efficiency requirements but at the same time to satisfy mechanical limitations of the blade. The disclosed design has arrived at by iteration between aerodynamics and mechanical design and allow the CV7241 to run in a safe and smooth manner.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A turbine bucket including a bucket airfoil having a tip shroud, said tip shroud having leading and trailing edges, said leading edge having a predetermined profile including first and second scalloped sections substantially in accordance with X and Y coordinate values in a Cartesian coordinate system at points 1-6 and 7-21, respectively set forth in Table I, where X and Y are distances in inches from an origin and, when points 1-6 and points 7-21 are respectively connected by smooth, continuing arcs, the points define the first and second scalloped sections of the leading edge tip shroud profile.

2. A turbine bucket according to claim 1, wherein the leading edge profile lies in an envelope within +/−0.080 inches in a direction normal to any location along the leading edge profile.

3. A turbine bucket according to claim 1, wherein the X and Y values set forth in Table I are scalable as a function of the same number to provide a scaled-up or scaled-down leading edge profile.

4. A turbine bucket according to claim 1, wherein said trailing edge having a predetermined profile including a scalloped section substantially in accordance with X and Y coordinate values in a Cartesian coordinate system at points 22-41 set forth in Table I, where X and Y are distances in inches from an origin and, when points 22-41 are connected by smooth, continuing arcs, the points define the scalloped section of the trailing edge tip shroud profile.

5. A turbine bucket according to claim 1, wherein said tip shroud further comprises first and second Z form edge profiles, said first and second Z form edge profiles having a predetermined profile substantially in accordance with X and Y coordinate values in a Cartesian coordinate system at points 42-59 and 60-77, respectively set forth in Table II, where X and Y are distances in inches from an origin and, when points 42-59 and points 60-77 are respectively connected by smooth, continuing arcs or lines, the points define the first and second Z form edge profiles.

6. A turbine bucket according to claim 1, wherein said tip shroud further comprises first and second, leading and trailing, seal rails extending between circumferential edges of said tip shroud, wherein a distance from the trailing edge of the airfoil to the trailing seal rail is about 0.81 inches and distance b to the leading seal rail is about 1.81 inches.

7. A turbine bucket according to claim 1, wherein said tip shroud further comprises first and second, leading and trailing, seal rails extending between circumferential edges of said tip shroud, wherein said seal rails further include cutter teeth, wherein the distance to a midpoint of the cutter tooth of the trailing seal rail from a trailing edge of the airfoil is about 1.44 inches and wherein the distance from said trailing edge to a midpoint of the cutter tooth of the leading seal rail is about 2.43 inches.

8. A turbine bucket according to claim 1, wherein said tip shroud further comprises first and second Z form edge profiles, wherein said tip shroud further comprises first and second, leading and trailing, seal rails extending between said Z form edges, wherein the trailing seal rail is co-located with a hard face region of said Z form edges.

9. A turbine bucket including a bucket airfoil having a tip shroud, said tip shroud having leading and trailing edges, said trailing edge having a predetermined profile including a scalloped section substantially in accordance with X and Y coordinate values in a Cartesian coordinate system at points 22-41 set forth in Table I, where X and Y are distances in inches from an origin and, when points 22-41 are connected by smooth, continuing arcs, the points define the scalloped section of the trailing edge tip shroud profile.

10. A turbine bucket according to claim 9, wherein the leading edge profile lies in an envelope within +/−0.080 inches in a direction normal to any location along the leading edge profile.

11. A turbine bucket according to claim 9, wherein the X and Y values set forth in Table I are scalable as a function of the same number to provide a scaled-up or scaled-down leading edge profile.

12. A turbine bucket according to claim 9, wherein said tip shroud further comprises first and second, leading and trailing, seal rails extending between circumferential edges of said tip shroud, wherein a distance from the trailing edge of the airfoil to the trailing seal rail is about 0.81 inches and distance b to the leading seal rail is about 1.81 inches.

13. A turbine bucket according to claim 9, wherein said tip shroud further comprises first and second, leading and trailing, seal rails extending between circumferential edges of said tip shroud, wherein said seal rails further include cutter teeth, wherein the distance to a midpoint of the cutter tooth of the trailing seal rail from a trailing edge of the airfoil is about 1.44 inches and wherein the distance from said trailing edge to a midpoint of the cutter tooth of the leading seal rail is about 2.43 inches.

14. A turbine bucket according to claim 9, wherein said tip shroud further comprises first and second Z form edge profiles, wherein said tip shroud further comprises first and second, leading and trailing, seal rails extending between said Z form edges, wherein the trailing seal rail is co-located with a hard face region of said Z form edges.

15. A turbine bucket including a bucket airfoil having a tip shroud, said tip shroud having leading and trailing edges and first and second Z form edge profiles, said first and second Z form edge profiles having a predetermined profile substantially in accordance with X and Y coordinate values in a Cartesian coordinate system at points 42-59 and 60-77, respectively set forth in Table II, where X and Y are distances in inches from an origin and, when points 42-59 and points 60-77 are respectively connected by smooth, continuing arcs or lines, the points define the first and second Z form edge profiles.

16. A turbine bucket according to claim 15, wherein the leading edge profile lies in an envelope within +/−0.080 inches in a direction normal to any location along the leading edge profile.

17. A turbine bucket according to claim 15, wherein the X and Y values set forth in Table I are scalable as a function of the same number to provide a scaled-up or scaled-down leading edge profile.

18. A turbine bucket according to claim 15, wherein said tip shroud further comprises first and second, leading and trailing, seal rails extending between said Z form edges of said tip shroud, wherein a distance from the trailing edge of the airfoil to the trailing seal rail is about 0.81 inches and distance b to the leading seal rail is about 1.81 inches.

19. A turbine bucket according to claim 15, wherein said tip shroud further comprises first and second, leading and trailing, seal rails extending between said Z form edges of said tip shroud, wherein said seal rails further include cutter teeth, wherein the distance to a midpoint of the cutter tooth of the trailing seal rail from a trailing edge of the airfoil is about 1.44 inches and wherein the distance from said trailing edge to a midpoint of the cutter tooth of the leading seal rail is about 2.43 inches.

20. A turbine bucket according to claim 15, wherein said tip shroud further comprises first and second, leading and trailing, seal rails extending between said Z form edges, wherein the trailing seal rail is co-located with a hard face region of said Z form edges.

* * * * *